Figure 1:
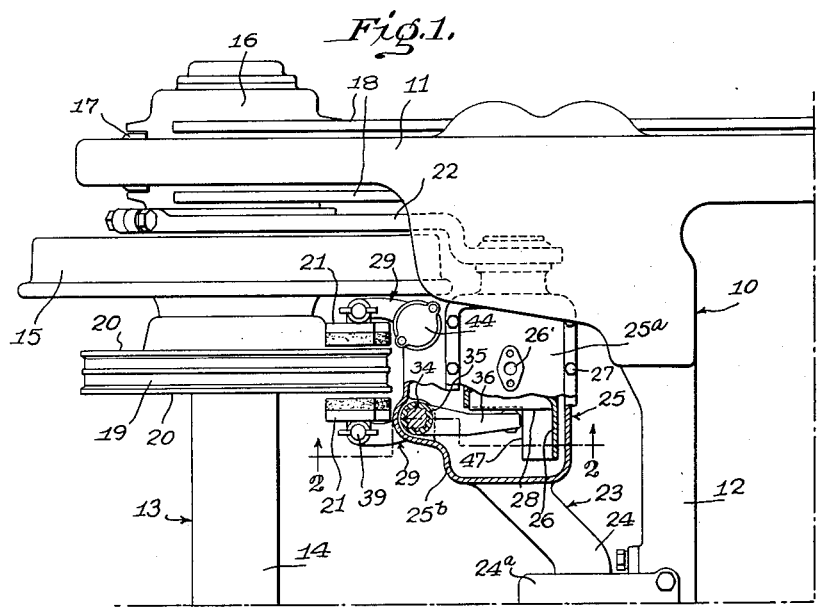

Aug. 14, 1945.   C. L. EKSERGIAN   2,382,551
BRAKE MECHANISM
Filed Feb. 29, 1944

INVENTOR.
Carolus L. Eksergian
BY
ATTORNEY

Patented Aug. 14, 1945

2,382,551

UNITED STATES PATENT OFFICE 2,382,551

BRAKE MECHANISM

Carolus L. Eksergian, Detroit, Mich., assignor to Budd Wheel Company, Philadelphia, Pa., a corporation of Pennsylvania Application February 29, 1944, Serial No. 524,371

4 Claims. (Cl. 188—153)

The invention relates to a brake mechanism and particularly to such a mechanism in which the actuating cylinder and the brake levers are in large part mounted within a closed housing.

The invention is particularly applicable to a brake mechanism for vehicle in which the frame is supported by a wheel and axle assembly including a rotary brake disc member with the opposite faces of which cooperate a pair of brake shoes and in which the shoes and their actuating means are supported by a U- or C-frame support carried at its ends from the ends of the wheel and axle assembly and intermediate its ends from the truck frame. In the region of a rotary brake disc the support is enlarged to provide a housing enclosing, in large part, the brake cylinder actuator and the actuating brake levers for the respective shoes.

It is an object of the invention to simplify the mounting of the actuating levers in the housing, to permit ready machining of the parts and to facilitate assembly and disassembly thereof.

Other and further objects and advantages and the manner in which they are attained will become apparent from the following detailed description when read in connection with the drawing forming a part of this specification.

Figure 2:
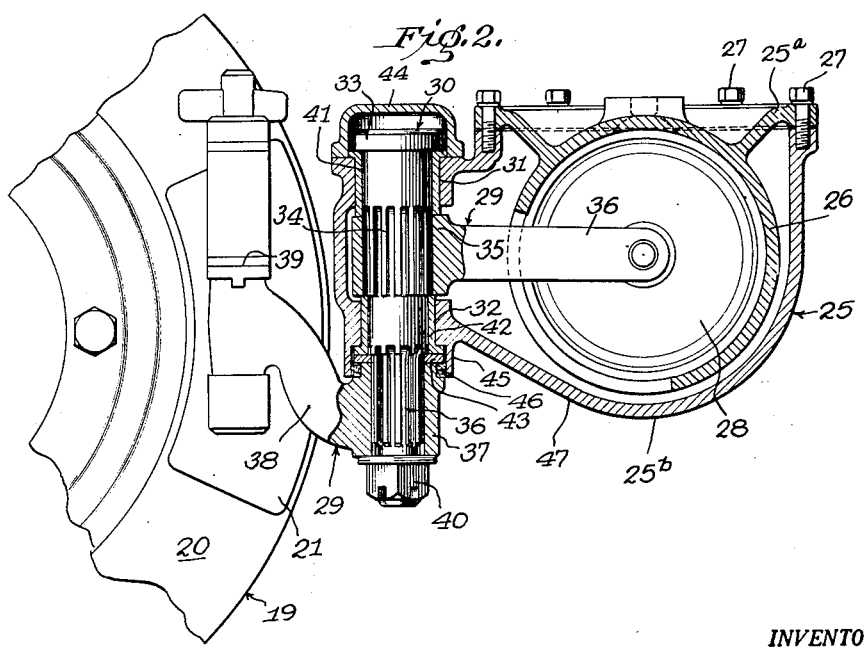

In the drawing:

Fig. 1 is a plan view of one quarter of a railway truck showing the invention applied thereto; and Fig. 2 is an enlarged vertical longitudinal sectional view, taken substantially along the line 2—2 of Fig. 1.

In the embodiment of the invention selected for illustration the truck frame is designated generally by 10 and comprises the side frames, as 11, interconnected by transoms, as 12.

Adjacent their ends the side frames are supported upon wheel and axle assemblies, designated generaly by 13, each such assembly comprising an axle 14, wheels, as 15, adjacent the ends of the axle, and journal boxes, as 16, outside the wheels and mounting the axle. The side frames, as 11, are guided for vertical movement with respect to the adjacent journal boxes 16 by the usual pedestals, as 17, and are spring-supported in the usual manner from the equalizer bars, as 18, having their ends resting on top of the respective journal boxes.

Inside each wheel, as 15, of a wheel and axle assembly 13 is secured a rotary brake disc 19 having opposed radial braking faces 20, 20. A pair of brake shoes, as 21, is associated, one with each radial braking face.

The brake shoes and their operating means are supported by a generally U- or C-shape support which comprises longitudinally extending arms, as 22, supported from the respective ends of the wheel and axle assembly 13 and a transverse tubular member, as 23, interconnecting them, this member being offset at 24 and supported therefrom a bracket 24a secured to the adjacent transom 12.

In the region of a rotary brake member 19, the transverse member 23 is enlarged to form a housing, as 25, enclosing most of the mechanism associated with the adjacent shoes 21 for actuating them.

Such mechanism may comprise a cylinder actuator, as 26, within the housing and removably associated therewith by being integrally formed with a top cover portion 25a closing the main body of the housing 25b. When assembled the parts 25a and 25b are secured together by a series of bolts, as 27. The cylinder actuator carries a pair of pistons, as 28, one associated with each of the brake levers, designated generally by 29, one being associated with each shoe 21. Fluid pressure is admitted between the pistons to force them outwardly through the central port 26' (Fig. 1). It is with these brake levers and the manner of their mounting in the housing that the invention is particularly concerned. Since each lever is similarly constructed, and similarly mounted, a description of one will suffice for an understanding of the invention.

Each lever comprises a pivot portion, as 30, mounted through spaced radial bearings, 31 and 32 in the housing 25. The pivot portion has a head 33 bearing against the end of the bearing 31. It will be seen that the portions of the pivot portion engaging the bearings 31 and 32 are of different diameters, the portion adjacent the head being of the larger diameter. This facilitates the cutting of splines, as 34, in the intermediate portion of the pivot portion disposed between the bearings, which splines 34 are designed to engage corresponding splines on the hub 35 of a lever arm 36 extending into the housing for cooperation with a respective piston 28.

The smaller diameter portion of the pivot portion 30 of the lever is extended outside the housing 25 beyond the bearing 32, and is there splined, as at 36, for engagement with corresponding splines in the hub 37 of a lever arm 38 extending outside the housing and pivotally carrying, as indicated at 39, the adjacent shoe 21.

The hub 37 of the arm 38 is held in engagement with the end of the bearing 32, as by a nut 40 threaded on the reduced end of the pivot portion beyond the splined portion 36. Suitable bearing bushings, as 41 and 42, are provided in the respective bearings 31 and 32 and a bearing washer, as 43, may be inserted between the end of the bearing 32 and the hub 37 of the lever arm 38.

The bearings are preferably sealed against the entrance of dirt and water. As shown the bearing 31 may be sealed by a cap, as 44, removably secured over the head 33 of the pivot and the associated end of the bearing 31. The bearing 32 is sealed by a depending skirt 45 from the bearing, which skirt is spaced from the adjacent portion of the hub 37 of the arm 38, and the space is filled by a sealing gasket 46.

Because of the different diameter bearings, the machining of the bearings is facilitated and the pivot portions of the levers can be most readily formed. The assembly of the parts is also facilitated, for with the cylinder and cover removed, the lever arm 36 is inserted through the opening in the casing with its splined hub portion 35 aligned with the bearings 31 and 32, then the headed pivot portion 30 is inserted from the top and finally the splined hub 37 of the arm 38 is slipped over the splined lower end of the pivot pin and locked in place by the nut 40. As shown in Figs. 1 and 2, the ends of the cylinder 26 are cut away, as at 47, to permit ready assembly of the cylinder with the housing when the levers are mounted in place. It will be understood, of course, that the levers 29 are provided with suitable spring means (not shown) to return them to their inoperative position shown and they are prevented from moving too far in this direction by suitable stops (not shown).

The disassembly of the parts will be equally facile but in the reverse order.

While a specific embodiment of the invention has been described herein, it will be understood that changes and modifications may be made without departing from the main features of the invention and such changes and modifications are intended to be covered by the appended claims.

What is claimed is:

1. In a brake mechanism, a support housing, a brake cylinder within said housing, a brake lever pivotally mounted in spaced bearings in said housing, said lever comprising a pivot portion having a head engaging the end of one of said bearings, spaced portions engaging said spaced bearings, and intermediate and end portions, the intermediate portion having splined connection with an arm extending into said housing for cooperation with said cylinder and said end portion having splined connection with an arm extending outside said housing for cooperation with a brake shoe, and removable means holding said arm in engagement with the end of the other of said bearings.

2. In a brake mechanism, a support comprising a housing, a cylinder actuator within the housing, a brake lever pivotally mounted in spaced bearings in said housing and comprising a pivot portion, an arm non-rotatably secured to said pivot portion and extending into the housing for cooperation with said actuator and another arm extending without said housing for cooperation with a brake shoe, the pivot portion comprising a headed portion engaging the end of one of said bearings, spaced bearing portions for cooperation with said spaced bearings, and an intermediate splined portion for non-rotatably securing said arm extending within the housing thereto, and an end portion opposite said head extending without the housing and splined to non-rotatably secure said arm extending without the housing, and removable means securing said arm in engagement with the end of the other of said bearings.

3. In a brake mechanism, a support housing, a brake cylinder removably mounted within said housing, a brake lever pivotally mounted in spaced bearings in said housing, one of said bearings being of larger diameter than the other bearing, said brake lever comprising a pivot portion engaging said bearings and having a headed portion engaging the end of said larger diameter bearing, an arm extending into said housing for cooperation with said cylinder and non-rotatably secured to said pivot portion intermediate the bearings and another arm non-rotatably secured to the pivot portion without the housing for cooperation with a brake shoe and engaging the end of said bearing of smaller diameter, and means securing said arm in such engaging position.

4. In a brake mechanism, a support housing, a cylinder actuator therein, a brake lever pivotally mounted in spaced bearings in said housing, said brake lever comprising a pivot portion engaging said bearings and having a headed portion engaging the end of one of said bearings to take the end thrust developed by the braking torque in one direction, a removable sealing cap enclosing said head and the adjacent end of said bearing, an arm non-rotatably secured to said pivot portion between the bearings and extending into the housing for co-action with said cylinder actuator, another arm extending without the housing, non-rotatably secured to said pivot portion outside the other of said bearings and engaging the adjacent end of said other bearing to take the end thrust in the opposite direction, and means for sealing the joint between said last-named arm and bearing.

CAROLUS L. EKSERGIAN.